E. Cook.
Upsetting Tires.
N° 55,199.  Patented May 29, 1866.
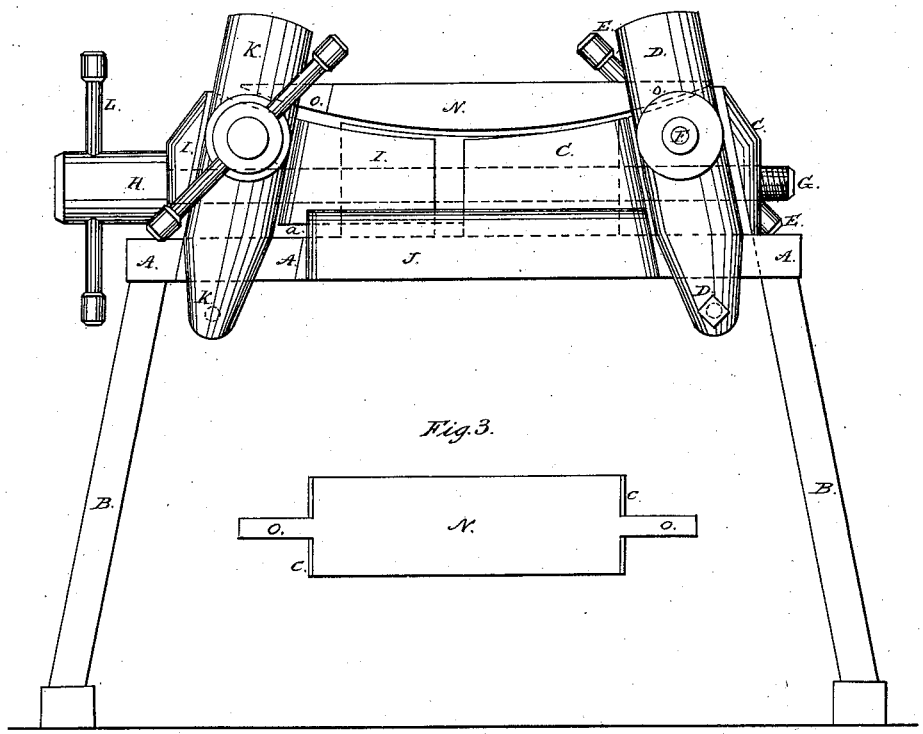
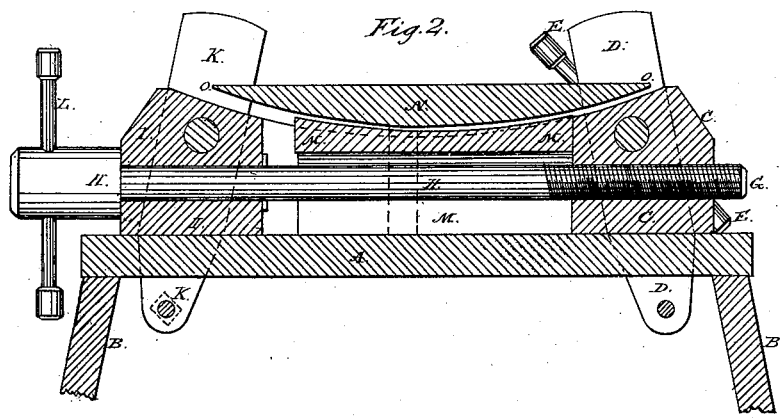
Witnesses:
Jno. D. Patton
N. W. Hulbert
Inventor:
Edward Cook.
By atty, A. B. Stoughton.

United States Patent Office.

EDWARD COOK, OF VALPARAISO, INDIANA, ASSIGNOR TO HIMSELF AND BRADFORD JONES, OF SAME PLACE.

MACHINE FOR UPSETTING WAGON-TIRES.

Specification forming part of Letters Patent No. 55,199, dated May 29, 1866.

*To all whom it may concern:*

Be it known that I, EDWARD COOK, of Valparaiso, in the county of Porter and State of Indiana, have invented certain new and useful Improvements in Machines for Upsetting Wagon-Tires or Bars of Iron; and I do hereby declare the following to be a full, clear, and exact description of the construction and operation of the same, reference being had to the accompanying drawings, making a part of this specification, in which—

Figure 1 represent a side elevation of the machine. Fig. 2 represents a longitudinal, vertical, and central section through the same. Fig. 3 represents a top plan of the presser or clamping bar removed from the machine.

Similar letters of reference, where they occur in the separate figures, denote like parts in all the drawings.

Many machines have been devised for shortening or upsetting bars of iron and wagon-tires, but are not arranged to work with that facility that the operation demands, while most of them mar the bar or tire by the means used for clamping them.

My invention consists in the manner in which I have arranged and combined the clamps and clamping-bar with the anvil and sectional moving frame for the purpose of facilitating the operation of upsetting without marring the iron bar or tire.

To enable others skilled in the art to make and use my invention, I will proceed to describe the same with reference to the drawings.

A is a bed-piece, supported on legs B. On this bench A, at or near one of its ends, is arranged a permanent frame, C, in which are formed inclined recesses for receiving the inclined clamp D, said clamp being constructed like an ordinary bench-clamp, with a handle, E, passing through the head of the bench-screw F, to work the clamps by. The end of the permanent frame C has a nut or female screw cut or formed in it to take the screw-thread G of a long screw, H, that passes longitudinally through the machine.

Upon the opposite end of the bed is arranged a moving frame, I, which is guided and held to the bed by tongues *a* on said movable part, working in grooves in the guide-pieces J fastened to the bed. This movable portion I has a bench-clamp, K, secured to it, which clamp is also inclined, as shown, and operated as the clamp D is. The head of the long screw H bears against the end of this movable part I, and by means of the handle or lever L passing through said head the movable portion I is run to or from the stationary portion C as occasion may require.

The moving and permanent sections or frames I C form in their interior portion a box or hollow space, in which an anvil-block, M, is placed, and the top of which is flush with or rises a little above the top of the sections I C. This anvil-block is designed for receiving the bar or tire that is to be shortened or upset, and is moreover removable, so that if it be a straight bar that is to be operated upon a straight-faced anvil may be used, and if a wagon-tire of greater or less curvature an anvil-block of similar concave curvature may be used. By this means no bends or short curves are put in the bar or tire acted upon.

The bar or tire having been placed on the anvil-block M, a clamping-bar, N, so made that the tenons or arms O upon its ends shall pass in between the jaws of the bench-clamps K D, is placed on top of said bar or tire, and the clamps K D are tightly run up against the bar or tire, which also passes between them. The inclination of the clamps K D, which incline toward each other at their tops, receive the bevel or inclination *c* of the ends of the clamping-bar N, so that said bar is prevented from rising when the force of the screw H is applied to the shortening or upsetting of said bar or tire.

If it be a straight bar that is to be acted upon, then a clamping-bar with a straight side is to be used; but if it be a curved bar or tire, then a bar with a curved side corresponding to the curvature of the bar or tire and of the anvil-block is used.

No short kinks or curves can by this machine be put into the bar or tire. The fibers of the metal are driven into each other endwise, and there is no marring or indenting of the bar or tire by the clamps, which is important in this operation.

Having thus fully described my machine for shortening or upsetting bars of iron, wagon-tires, &c., what I claim therein as new, and desire to secure by Letters Patent, is—

In combination with the movable section I and the immovable section C, united by the long screw H, the inclined clamps K D and the anvil and clamping-bars M N, the whole arranged to operate substantially as herein described and represented.

EDWARD COOK.

Witnesses:
JACOB BREWER,
ADELBERT JONES.